US008004969B2

(12) United States Patent
Froehlich et al.

(10) Patent No.: US 8,004,969 B2
(45) Date of Patent: Aug. 23, 2011

(54) CELL LEVEL CONGESTION POLICY MANAGEMENT

(75) Inventors: Robert W. Froehlich, McKinney, TX (US); Rangaprasad Govindarajan, Plano, TX (US); Jogen K Pathak, Irving, TX (US); Vyankatesh Shanbhag, Plano, TX (US)

(73) Assignee: Tektronix, Inc., Beaverton, OR (US)

( * ) Notice: Subject to any disclaimer, the term of this patent is extended or adjusted under 35 U.S.C. 154(b) by 1325 days.

(21) Appl. No.: 10/289,638

(22) Filed: Nov. 7, 2002

(65) Prior Publication Data
US 2003/0095526 A1 May 22, 2003

Related U.S. Application Data

(60) Provisional application No. 60/347,981, filed on Nov. 7, 2001, provisional application No. 60/337,731, filed on Nov. 8, 2001.

(51) Int. Cl.
*G08C 15/00* (2006.01)
(52) U.S. Cl. ......... 370/229; 370/235; 370/328; 370/401
(58) Field of Classification Search .................. 370/230, 370/310, 328, 338, 401, 412
See application file for complete search history.

(56) References Cited

U.S. PATENT DOCUMENTS

| 4,430,701 A | 2/1984 | Christian et al. |
| 5,197,002 A | 3/1993 | Spencer |
| 5,287,499 A | 2/1994 | Nemes |
| 5,566,171 A | 10/1996 | Levinson |
| 5,566,297 A | 10/1996 | Devarakonda et al. |
| 5,594,863 A | 1/1997 | Stiles |
| 5,623,601 A | 4/1997 | Va |
| 5,708,655 A | 1/1998 | Toth et al. |
| 5,758,088 A | 5/1998 | Bezaire et al. |
| 5,761,405 A | 6/1998 | Tadamura et al. |
| 5,799,154 A | 8/1998 | Kuriyan |
| 5,841,764 A | 11/1998 | Roderique et al. |
| 5,896,496 A | 4/1999 | Suzuki |
| 5,987,320 A | 11/1999 | Bobick |
| 6,018,805 A | 1/2000 | Ma et al. |
| 6,044,272 A | 3/2000 | Kobylinski et al. |
| 6,070,190 A | 5/2000 | Reps et al. |
| 6,078,566 A | 6/2000 | Kikinis |

(Continued)

FOREIGN PATENT DOCUMENTS
EP  1061699  12/2000
(Continued)

OTHER PUBLICATIONS

Harbaum, Zitterbart, Griffoul, Rothig, Schaller, and Stuttgen, "Layer 4+ Switching with QOS Support for RTP and HTTP", Dec. 1, 1999, IEEE GILOBECOM '99, p. 1591-1596.*

(Continued)

*Primary Examiner* — Dang T Ton
*Assistant Examiner* — Brian O'Connor
(74) *Attorney, Agent, or Firm* — Michael J. Forgarty, III; Matthew D. Rabdau (57) ABSTRACT

A system and method for transmitting data packets to a wireless client is shown. The data packets are received by a wireless content switch in the wireless network. The wireless content switch determines a quality of service value for the wireless client. The wireless content switch assigns the priority of transmission for the data packet based on the assigned quality of service value. The data packet is transmitted according to the priority.

16 Claims, 4 Drawing Sheets

U.S. PATENT DOCUMENTS

| | | | |
|---|---|---|---|
| 6,085,105 | A | 7/2000 | Becher |
| 6,144,849 | A | 11/2000 | Nodoushani et al. |
| 6,148,177 | A | 11/2000 | Faris et al. |
| 6,173,384 | B1 | 1/2001 | Weaver |
| 6,178,331 | B1 | 1/2001 | Holmes et al. |
| 6,201,962 | B1 | 3/2001 | Sturniolo et al. |
| 6,215,994 | B1 | 4/2001 | Schmidt et al. |
| 6,226,267 | B1 | 5/2001 | Spinney et al. |
| 8,230,185 | | 5/2001 | Cook, III |
| 6,249,516 | B1 | 6/2001 | Brownrigg et al. |
| 6,278,701 | B1 * | 8/2001 | Ayyagari et al. ............ 370/335 |
| 6,363,053 | B1 * | 3/2002 | Schuster et al. ............. 370/230 |
| 6,721,554 | B2 * | 4/2004 | Gnesda et al. ............... 455/406 |
| 6,728,208 | B1 * | 4/2004 | Puuskari ................... 370/230.1 |
| 6,845,100 | B1 * | 1/2005 | Rinne ..................... 370/395.43 |
| 6,920,116 | B1 * | 7/2005 | Hossain et al. .............. 370/329 |
| 6,941,378 | B2 * | 9/2005 | Apostolopoulos et al. ... 709/231 |
| 6,970,423 | B2 * | 11/2005 | Chuah .......................... 370/230 |
| 6,996,618 | B2 * | 2/2006 | Apostolopoulos et al. ... 709/227 |
| 7,027,825 | B2 * | 4/2006 | Mizell et al. ................. 455/466 |
| 7,027,826 | B2 * | 4/2006 | Mizell et al. ................. 455/466 |
| 7,058,387 | B2 * | 6/2006 | Kumar et al. ................ 455/406 |
| 7,106,737 | B1 * | 9/2006 | Beyda et al. ................. 370/392 |
| 7,120,694 | B2 * | 10/2006 | Sinha ........................... 709/228 |
| 7,136,382 | B1 * | 11/2006 | Sharma et al. .............. 370/392 |
| 7,149,772 | B1 * | 12/2006 | Kalavade ..................... 709/203 |
| 7,193,985 | B1 * | 3/2007 | Lewis et al. ................. 370/338 |
| 7,346,684 | B2 * | 3/2008 | Borella ........................ 709/225 |
| 7,451,205 | B2 * | 11/2008 | Cheung et al. .............. 709/224 |
| 2001/0028636 | A1 | 10/2001 | Skog et al. |
| 2001/0037358 | A1 | 11/2001 | Clubb et al. |
| 2002/0009986 | A1 | 1/2002 | Bern et al. |
| 2002/0118663 | A1 | 8/2002 | Dorenbosch et al. |
| 2002/0191595 | A1 * | 12/2002 | Mar et al. ..................... 370/352 |

FOREIGN PATENT DOCUMENTS

| | | |
|---|---|---|
| WO | 99/16266 | 4/1999 |
| WO | 00/18154 | 3/2000 |
| WO | 00/21231 | 4/2000 |

OTHER PUBLICATIONS

Improving TCP/IP Performance over Wireless Networks—Hari Balakrishnan, et al. In Proc. 1st ACM Int'l Conf. Mobile Computing and Networking (MobiCom) Nov. 95.

Layer 4+ Switching With QOS Support for RTP and HTTP; Till Harbaum, et al.; Global Telecommunications Conference—Globecom '99.

1xRTT End-to-End Performance Evaluation;Hang Jiang, et al. Version 1.0, Jul. 15, 1999.

TCP for Wireless and Mobile Hosts (MobiCom '99 Tutorial)i; Nitin H. Vaidya, Texas A&M University.

Global Systems for Mobile Communications, "Digital cellular telecommunications system (Phase 2+) (GSM); Universal Mobile Telecommunications System (UMTS); Mobile radio interface layer 3 specification; Core Network Protocols—Stage 3 (3GPP TS 24.008 version 3.6.0 Release 1999," Technical Specification, ETSI TS 124 008 V3.6.0, Dec. 2000, 437 pages.

* cited by examiner

CELL LEVEL CONGESTION POLICY MANAGEMENT

CROSS-REFERENCE TO RELATED APPLICATIONS

This application claims the priority benefit of U.S. Provisional Applications for Patent, Ser. No. 60/347,981, entitled "Gb Parameter Based Radio Priority," filed on Nov. 7, 2001 and Ser. No. 60/337,731, entitled "Cell Level Congestion Policy Management," filed on Nov. 8, 2001 which are hereby incorporated by reference for all purposes. This application is related to U.S. patent application Ser. No. 10/289,767, entitled "Gb Parameter Based Radio Priority," filed herewith and which is commonly owned and assigned with the present application and is hereby incorporated by reference.

STATEMENT REGARDING FEDERALLY SPONSORED RESEARCH/DEVELOPMENT

Not Applicable.

FIELD

The present application relates to wireless packet data networks, and more particularly to cell level wireless quality of service.

BACKGROUND

Wireless networks which were originally designed for wireless telephone services are being adapted for wireless data services as well. The wireless networks are adapted for wireless data services by linking the wireless network to the preexisting wired data network, wireless packet data protocols such as General Packet Radio Services (GPRS) were developed to facilitate the transmission of data packets over the wireless network.

The most common wired data network is the Internet. The Internet is a global network connecting computers from government agencies, education institutions, the military, and businesses from around the world. Data is transmitted over the Internet using data packets. The data packets are sent from a sender to a recipient over any one of a number of network connections between the sender to the recipient.

Where the recipient is a wireless client, the data packet is sent from the wired network, e.g., the Internet, to a wireless network associated with the wireless client. The wireless network routes the data packet to a radio transceiver region that maintains radio communications with the wireless client. The radio transceiver transmits the data packet over the wireless interface to the wireless client.

The available bandwidth for transmission of data packets over the wireless air interface is usually lower as compared to other parts of the communication network. As a result, a backlog of data packets exists for transmission over the air interface. The resulting backlog significantly affects the throughput rate of the wireless packet data network.

The data packets are transmitted in accordance with a priority scheme, wherein each data packet is associated with a particular priority. For example, in a GPRS network, each data packet is associated with a radio priority, wherein packets with the lowest radio priority level are transmitted first.

The assignment of radio priority is based on a subscriber profile parameter which is associated with the subscriber at the wireless client. The subscriber profile parameters is known as the Quality of Service parameter. Accordingly, the wireless network provider can offer different levels and prices for subscription, based on the Quality of Service parameter which determines the priority of transmission for data packets.

However, quality implies the process of delivering data in a reliable and timely manner, where the definition of reliable and timely is dependent upon the type of traffic being addressed. A casual user doing occasional Internet browsing may have a different definition of Quality of Service than a large business user access and downloading databases or financial files. Therefore, Quality of Service is a continuum defined by the network performance characteristics, applications of the users and the particular service level agreements of the users.

Accordingly, it would be advantageous if the priority of transmission for the data packets were based on the Quality of Service continuum.

SUMMARY

A system and method for transmitting data packets to a wireless client is shown. The data packets are received by a wireless content switch in the wireless network. The wireless content switch determines a quality of service value for the wireless client. The wireless content switch assigns the priority of transmission for the data packet based on the assigned quality of service value. The data packet is transmitted according to the priority.

DETAILED DESCRIPTION OF THE DRAWINGS

In the descriptions which follow, like parts are marked throughout the specification and drawings with the same numerals, respectively. The drawing figures are not necessarily drawn to scale and certain figures may be shown in exaggerated or generalized form in the interest of clarity and conciseness.

Figure 1:
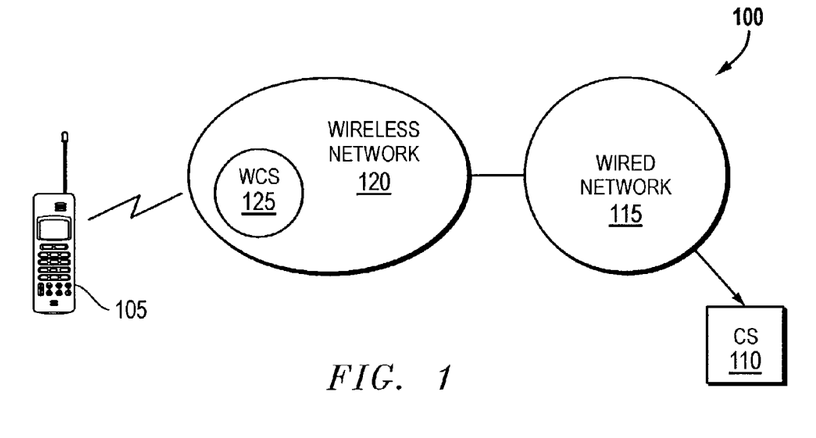
FIG. 1 is a block diagram of an exemplary communication network.

Referring now to FIG. 1, there is illustrated a block diagram of an exemplary communication network for transmitting data packets to a wireless client 105 from a content server 110. The wireless client 105 is a mobile terminal generally associated with a user or subscriber to the communication network 100, and can comprise, but is not limited to, a mobile station, a personal digital assistant, or a lap top or palm top computer capable of engaging in wireless data communications.

The content server 110 is a server computer which can include, for example, a web server. The content server 110 is generally connected to a wired network 115. The wired network 115 can comprise, for example, a local area network, a wide area network, or the Internet. Data is transmitted over the wired network 115 in a series of sequential partitions, know as data packets.

The wired network 115 is interfaced with a network 120 associated with the wireless client 105. The wireless network 120 includes a network of nodes which routes data packets to a geographic location within radio communication of the wireless client 105 and transmits the data packets over the wireless air interface to the wireless client 105. The wireless network 120 also includes a wireless content switch 125. The wireless content switch 125 is positioned in a manner to receive the data packets which are transmitted to and from the wireless client 105.

The available bandwidth for transmission of data packets over the wireless air interface is usually lower as compared to other parts of the communication network 100. As a result, a backlog of data packets exists for transmission over the air interface. The resulting backlog significantly affects the throughput rate of the communication network.

The data packets are transmitted over the wireless air interface in accordance with a priority scheme, wherein each data packet is associated with a particular priority. A quality of service value is determined and assigned for each wireless client 105. This quality of service value is based on the level of services which the subscriber associated with the wireless client 105 has purchased, the application pursuant to which the subscriber is receiving the data packets, and the quality of the cell in which the wireless client 105 is present. The cell quality is based upon the quantity of attached subscribers, the quantity of active sessions, the time of day, cell capacity, requested payload size and radio link quality. When the data packets are received by the wireless content switch 125, the wireless content switch 125 determines the quality of service value for the wireless client 105. The wireless content 125 then assigns a priority based on the quality of service value, including the cell quality. The assigned priority is then forwarded with the data packet for transmission over the wireless air interface to the wireless client 105.

Figure 2:
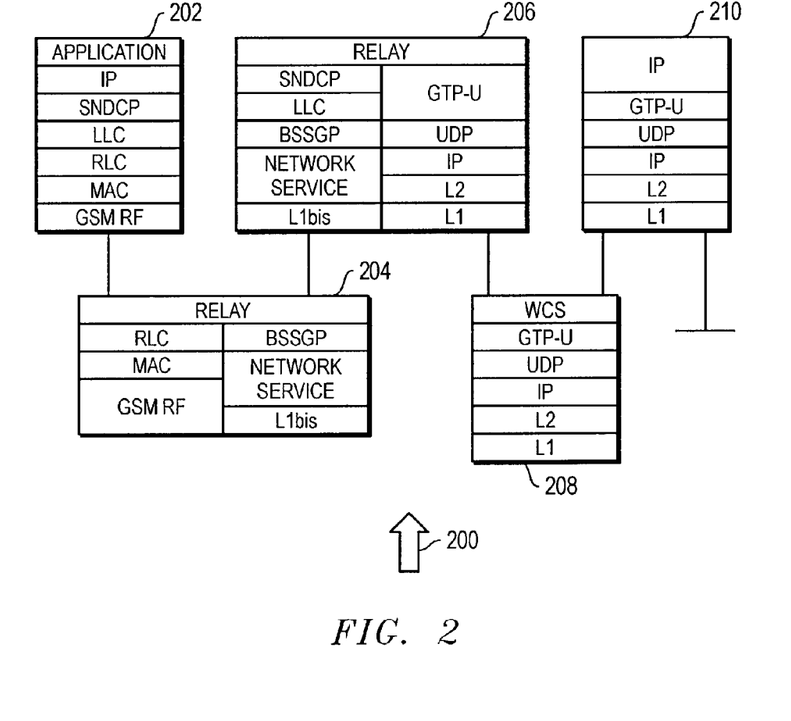
FIG. 2 is a diagram of a system for providing wireless content switching functionality in accordance with an exemplary embodiment of the present invention.

Referring now to FIG. 2, a diagram of a system 200 for providing wireless content switching functionality in accordance with an exemplary embodiment of the present invention in a GPRS network. System 200 includes a mobile station 202, a base station system 204, a serving GPRS support node 206, a wireless content switch 208, and a gateway GPRS support node 210, wherein each of these systems further comprises additional systems for processing data in accordance with Open Systems Interconnection (OSI) standards, Global System for Mobile Communications (GSM) standards, or other suitable standards.

Packet data reaches gateway GPRS support node 210 from a content server 110 in an Internet protocol processing layer. The Internet protocol processing layer also extracts GPRS tunneling protocol packet data using a GTP-U layer, user datagram protocol packets using a User Protocol (UDP) layer, and physical layer L1 and data link layer L2 data, using L1 and L2 layer protocols. The extracted data is then processed in accordance with the GPRS wireless network protocol to determine the serving GPRS support node 206 that the data should be transferred to, in addition to base station system 204 and mobile station 202 criteria.

Wireless content switch 208 is coupled to gateway GPRS support node 210 and performs processing using a wireless content switch application layer, a GTP-U layer, a UDP layer, an Internet protocol layer, and an L1 and L2 layer. Wireless content switch 208 can extract radio packet data from the GTP-U processing layer, and can perform additional processing to support quality of service functionality, multicasting functionality, and other functionality. The wireless content switch application layer also receives data from the UDP layer, the IP layer, and the L1 and L2 layers in support of this functionality. Wireless content switch 208 then transmits data to serving GPRS support node 206 after the process data is stored back into the GTP radio packet data.

Serving GPRS support node 206 interfaces with wireless content switch 208 at the GTP-U layer, UDP later, IP layer, L2 layer, and L1 layer, and performs additional processing to determine the location of a mobile station 202 and base station system 204 serving the mobile station. Serving GPRS support node 206 transmits the packet data to a base station system 204 via a relay layer, and also performs additional subnetwork convergence protocol (SNDCP) processing, logical link control (LLC) processing, base station subsystem GPRS protocol (BSSGP) processing, network service processing, and L1bis processing.

Base station system 204 receives the various layers of data from serving GPRS Support node 206 over a relay connection or other suitable connections and performs radio link control (RLC) processing, medium access control (MAC) processing, GSM radio frequency (GSMRF) control, and additional processing so as to allow the radio packet data to be transmitted to the correct mobile station that the radio packet data is addressed to, as per the standard specification-compliant implementation.

Mobile station 202 includes RF, medium access control, radio link control, logical layer control, SNDCP and IP processing functionality, so as to allow mobile station 202 to function within one or more wireless networks, including a GPRS wireless network. In addition, mobile station 202 can include one or more applications which interface with wireless content switch applications on wireless content switch 208, server applications operating on content server 110, or other suitable applications. The specific presence or implementation of an application on the mobile station is not required. Configuration data for mobile station 202 can be stored at wireless content switch 208, content server 110, or at other suitable locations, such as in accordance with the Lightweight Directory Access Protocol (LDAP) or proprietary information exchange protocols. Likewise, wireless content switch 208 can determine the operational specifications for mobile station 202 by analyzing data extracted from the GTP-U, UDP, IP, L1, and L2 processing layers as the data being transmitted to and from mobile station 202 is processed by wireless content switch 208.

In operation, system 200 allows processing of radio packet data to facilitate quality of service functionality for transmitting and receiving radio packet data with mobile station 202 through wireless content switch 208. Wireless content switch 208 extracts predetermined message and data fields from signaling or control messages, bearer or user data contained in the packet, or other suitable data layers, and can perform additional processing of the radio packet data to provide predetermined services to mobile station 202.

Figure 3:
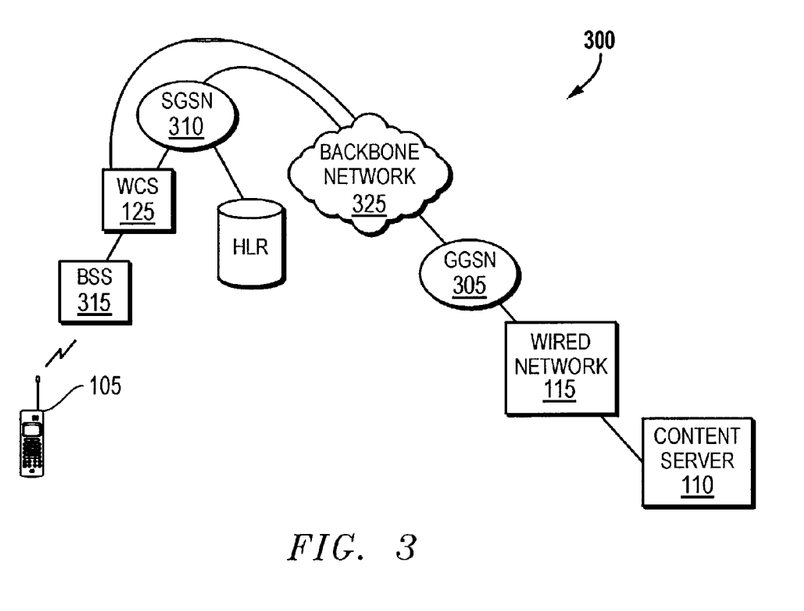
FIG. 3 is a block diagram of an exemplary communication network supporting General Packet Radio Services.

Referring now to FIG. 3, there is illustrated a block diagram of an exemplary communication network supporting General Packet Radio Services. It is noted that certain elements have been omitted for the purposes of simplicity, and therefore, the figure is not intended as an exhaustive illustration. The wireless network 120 interfaces with the wired network 115 by any number of Gateway GPRS Support Nodes (GGSN) 305. Each GCSN 305 is associated with any number of IP addresses which the GGSN 305, in turn, allocates to wireless clients 105, either statically, or dynamically.

The wireless network 120 provides packet data services to geographical areas which are divided into routing areas. Each routing area is associated with a particular Service GPRS Support Node (SGSN) 310. Each SGSN 310 is associated with any number of base station systems 315. The base station systems 315 comprise the radio transceiver equipment which transmits and receives signals to and from the wireless clients 105. Base station systems 315 maintain radio frequency communications with a geographic area known as a cell.

The SGSN 310 and the GGSN 305 are interconnected by a backbone network 325. The backbone network 325 routes packet data between the SGSN 310 and the GGSN 305. During transmission from the content server 110 to the wireless client 105, the content server 110 transmits the data packets to an IP address associated with the GGSN 305. The GGSN 305 receives the data packet, determines the identity and location of the wireless client 105 associated with the IP address, and forwards the packet towards the wireless client 105.

The network also includes a home location register (HLR) 330 which comprises a database which stores subscriber profile for each subscriber subscribing to the network. The subscriber profiles include parameters which indicate information, such as the subscription level of service which the subscriber has purchased. During establishment of an Internet access for the wireless client 105, the SGSN 310 authenticates the identity of the wireless client 105 using the records stored in the HLR 330. Additionally, the SGSN 310 establishes the Quality of Service which the subscriber associated with the wireless client 105 has purchased. During an Internet session, the SGSN 310 receives data packets from the content server 110 and forwards the data packets to the base station system 315. Prior to forwarding the data packets to the base station system 315, the SGSN 310 maps the quality of service parameter to a radio priority. The foregoing radio priority is then transmitted with the data packet towards the base station system 315.

Additionally, a wireless content switch 125 is connected between the base station system 315 and the SGSN 310. The interface between the SGSN 310 and the base station system 315 is known as the Gb interface for GPRS. Accordingly, the wireless content switch 125 receives all signals transmitted over the Gb interface, including the data packets for transmission to the wireless client 105. In one exemplary embodiment, the wireless content switch 125 is an Intelligent Packet Control Node (IPCN) developed and manufactured by Cyneta Networks, Inc.

The wireless content switch 125 examines the IP layer of the data packets for a parameter known as the type of service parameter. The type of service parameter is indicative of the type of application pursuant to which the packet is transmitted to the wireless client 105. The wireless content switch 125 also determines the quality of the cell in which the wireless client 105 is present. The cell quality is based upon the quantity of attached subscribers, the quantity of active sessions, the time of day, network and cell capabilities, and radio link quality. The quality of service value includes the type of service parameter, the application pursuant to which the subscriber is receiving the data packets and the cell quality.

The wireless content switch 125 replaces the radio priority in the data packet with a new radio priority which is based on the quality of service value. The quality of service value can be calculated from different parameters received from different Open Systems International (OSI) layers.

Figure 4:
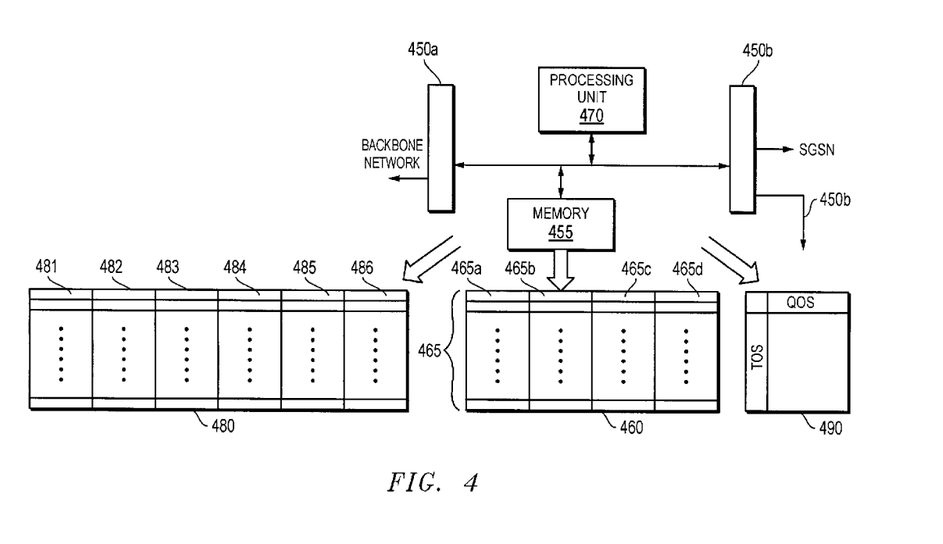
FIG. 4 is a block diagram of an exemplary wireless content switch.

Referring now to FIG. 4, there is illustrated a block diagram of an exemplary wireless content switch 125. The wireless content switch 125 includes any number of upstream ports 450b and downstream ports 450a. The upstream ports 450b facilitate connection of the wireless content switch 125 towards the content server 110 via a trunk line, such as, for example, a T1, E1, or an Ethernet connection, to name a few. In one embodiment, an upstream port 450b can be connected to the SGSN 310 via a trunk line. Similarly, the downstream ports 450a facilitated connection of the wireless content switch 125 towards the wireless client via a trunk line. In one embodiment, the downstream ports 450a can be connected to the base station system 315. Connection of the ports 450 in the foregoing matter permit receipt and transmission of the data packets which are transmitted between the wireless client 105 and the content server 110.

The wireless content switch 125 also includes memory 455 for storing a quality of service table 460. The quality of service table 460 includes any number of records 465, each of which are associated with a particular wireless client 105 receiving wireless packet data services from the SGSN 310. Each record contains a client identifier 465a, a client IP address identifier 465b, a quality of service parameter 465c and a cell ID 465d. The client identifier 465a identifies the wireless client 105 associated with the record 465. The client quality of service parameter 465c is the quality of service parameter 465c of the subscriber profile for the wireless client 105 associated with the record 465.

Additionally, the memory 455 stores a radio priority table 490. The radio priority table 490 maps various combinations of quality of service values with a particular priority. Therefore, the radio priority is based upon the quality of service value.

The memory 455 also stores a cell congestion table 480. The cell congestion table 480 includes all cell identity records 481 of the base station systems 315. Each cell identity record 481 contains the cell quality attribute 482, attached subscribers 483, quality of active sessions 484, radio link quality 485 and requested payload size 486.

In one embodiment, the quality of service value can be mapped to reflect the varying customer perceptions of service based on the various applications. For example, wherein the type of service indicates that the application is a video streaming application, a higher radio priority can be mapped, whereas a lower priority can be mapped wherein the type of service indicates email, notwithstanding the same quality of service parameter.

The memory 455 can also store a plurality of instruction executable by a processor 470. The foregoing instructions, when executed by the processor 470, cause the processor 470 to maintain the records 465 for each wireless client 105 which commences data services with the SGSN 310, including the IP address and quality of service associated therewith. The foregoing instructions, when executed, cause the processor 470 to maintain records relating to the cell quality covered by a base station system 315, including the quantity of attached subscribers 483, the quantity of active sessions 484, and the radio link quality 485 of the base station system 315 and the wireless clients 105.

When a data packet is received at upstream port 450b for a wireless client 105, the identity of the recipient wireless client 105 and the type of service parameter are determined. The type of service parameter can be determined by examination of the TCP layer of the data packet. The identity of the wireless client 105 can be determined by examination of the destination IP address or subscriber identity number associated with the data packet and selecting the record 465 with a matching client IP address identifier 465b. The client quality of service 465c is then retrieved from the record 465. The quality of service 465c, the type of service parameter, and the cell quality 482 are then used to determine the quality of service value. The quality of service value is then used to look up the corresponding radio priority from the radio priority table 490. The radio priority is then used to replace the radio priority in the data packet. The wireless content switch. 125 then transmits the data packet to the base station system 315.

The wireless content switch 125 is discussed further in U.S. patent application Ser. No. 09/839,830 entitled "System and Method for Wireless Packet Data Content Switch," which is commonly owned and assigned with the present application and in U.S. patent application Ser. No. 09/884,663 entitled "Packet Retransmission in Wireless Packet Data Networks," which is commonly owned and assigned with the present application and both of which are hereby incorporated by reference.

Figure 5:
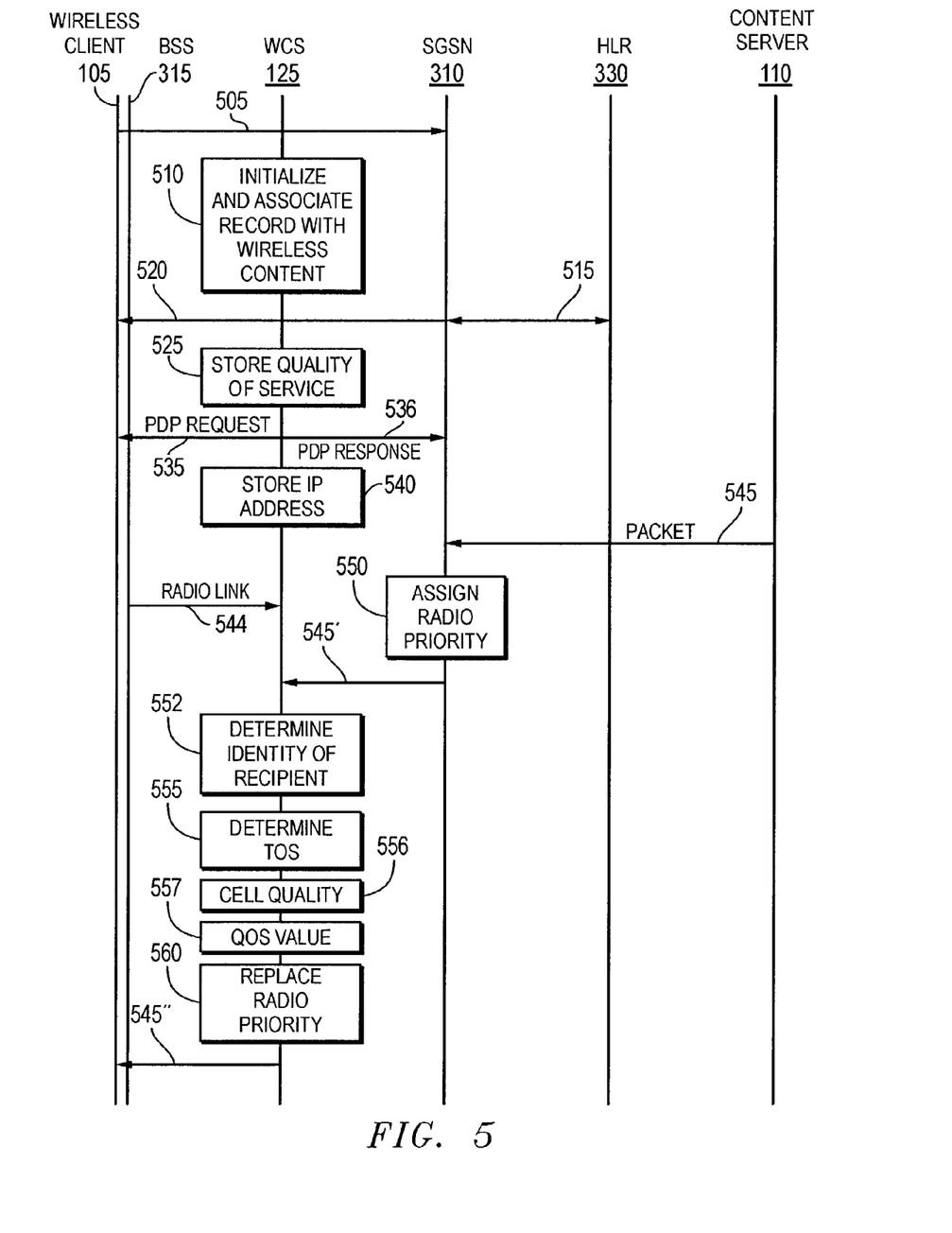
FIG. 5 is a signal flow diagram describing the operation of the communication network.

Referring now to FIG. 5, there is illustrated a signal flow diagram describing the operation of the communication network. A packet data session is commenced by the transmission of an attachment message (signal 505) from the wireless client 105 to the SGSN 310 via the base station system 315 and the wireless content switch 125. When the wireless content switch 125 receives at the downstream port 450a the foregoing attachment message, the wireless content switch 125 initializes a record 465 and associates the record with the wireless client 105 by storing (action 510) the identity of the wireless client 105 at the wireless client identifier of the record 465a. The wireless content switch 125 also increments the attached subscriber value in action 510. The SGSN 310 responds by querying (signal 515) the HLR 330 to authenticate the wireless client 105 and download the subscriber profile. After querying the HLR 330, the SGSN 310 transmits an attachment acknowledgment (signal 520) to the wireless client 105 via the wireless content switch 125. The attachment acknowledgment includes the subscriber profile downloaded from the HLR 330. Upon receipt of the attachment acknowledgment at the upstream port 450b, the wireless content switch 125 stores the quality of service parameter, in the client quality of service indicator 465c (action 525).

Additionally, the wireless client 105 also transmits a Packet Data Protocol (PDF) context request (signal 535) to the SGSN 310 which responds by transmitting a PDP context response (signal 536). The IP address associated with the wireless client 105 is contained in either the PDP request or PDP response, depending on whether the wireless client 105 is allocated the IP address on a static or dynamic basis. Both the PDP request and response messages (signals 535 and 536) are received at the wireless content switch 125 at the downstream port 450a and the upstream port 450b, respectively. Upon receipt of the foregoing signals, the wireless content switch 125 stores the IP address associated with the wireless client 105 in the IP address identifier 465b of the record 465 associated with the wireless client 105 (action 540) and illeltalients the active session value.

Upon completion of the PDP request/response signaling, the wireless client 105 commences an Internet session and the base station system 315 provides the radio link quality (signal 544). Pursuant to the session, the content server 110 transmits data packets (signal 545) which are associated with a particular type of application addressed to the wireless content switch 105. The type of application can include, for example, web browsing (hypertext protocol transmission, http), a file transfer (file-transfer protocol, ftp), email (simple mail transmission protocol, SMTP), streaming video, or streaming audio, to name a few. The data packets are received by the SGSN 310 which assigns (action 550) a radio priority to the data packets, based on the quality of service parameter in the subscriber profile associated with the wireless client 105. The data packet with the radio priority is then transmitted (signal 545') towards the wireless client 105 via the wireless content switch 125. The wireless content switch 125 receives the data packet at the upstream port 450b.

When the data packet is received at upstream port 450b for a client 105, the identity of the recipient wireless client 105 (action 552), the radio link quality (action 553), the type of service parameter (action 555) and the cell quality (action 556) are determined. The type of service parameter can be determined by examination of the TCP layer of the data packet. The identity of the wireless client 105 can be determined by examination of the destination IP address, associated with the data packet and selecting the record 465 with a matching client IP address identifier 465b. The wireless content switch 125 can determine the radio link quality from the radio link quality messages (signal 544) from the base station system 315. The radio status message is indicative of the quality of the wireless link. However, other means to determine the radio link quality are available and do not detract from the spirit of the invention. The wireless content switch then determines the cell quality (action 556) based upon the quantity of attached subscribers, the quantity of active sessions, the time of day, cell capacity, requested payload size and the radio link quality. The client quality of service 465c is then retrieved from the record 465.

The quality of service value is determined (action 557) based upon the quality of service parameter 465c, the type of service parameter and the cell quality 556. The quality of service value is then used to look up the corresponding radio priority from the radio priority table 490. The radio priority is then used to replace the radio priority in the data packet (action 560). The wireless content switch 125 then transmits the data packet (signal 545") to the base station system 315 via the downstream port 450a.

In one disclosed embodiment, the cell quality 482 is based upon the weighted values of the quantity of attached subscribers, the quantity of active sessions, the time of day, cell capacity, requested payload size and radio link quality, however, in calculating the cell quality, a wide range of variable are available, including but not limited to PDP contents, round trip time of data packets, logical link control discards, and the wireless client state (standby/ready), without detracting from the spirit of the invention.

In another disclosed embodiment, the cell quality is determined as the sum of the subscriber flows divided by the cell capacity. This sum is multiplied by a predetermined threshold. The cell quality is then identified as one of a subset of choices. Based upon this cell quality, the quality of service is determined through the use of lookup tables. The radio priority is then derived from the quality of service value.

Although the foregoing detailed description describes certain embodiments with a degree of specificity, it should be noted that the foregoing embodiments are by way of example, and are subject to modifications, substitutions, or alterations without departing from the spirit or scope of the invention. For example, one embodiment can be implemented as sets of instructions resident in memory 455. In another embodiment, the wireless content switch 125 may be integrated with either the SGSN 310 or the base station system 315. Those skilled in the art will recognize that physical storage of instructions physically changes the medium upon which it is stored electronically, magnetically, or chemically so that the medium carries computer readable information. Accordingly, the inventions are only limited by the following claims, and equivalents, thereof.

What is claimed is:

1. A method of transmitting data packets to a wireless client via a wireless content switch, said method comprising:
receiving, at the wireless content switch, a data packet for a wireless client, wherein the data packet has a first radio priority information element;

determining a type of service parameter for the data packet;
determining a cell quality of a cell serving the wireless client;
determining a quality of service value for the data packet based upon the type of service parameter and the cell quality;
replacing the first radio priority information element for the data packet with a second radio priority information element that is based on the quality of service value; and
transmitting, from the wireless content switch, the data packet with the second radio priority information element to the wireless client.

2. The method of claim 1, wherein determining a cell quality includes determining the quantity of attached subscribers, the quantity of active sessions, the time of day, cell capacity, requested payload size and the radio link quality.

3. The method of claim 1, wherein the first radio priority information element is based on a quality of service parameter.

4. The method of claim 1, wherein the second radio priority information element is assigned from a look-up table.

5. The method of claim 1, wherein determining the quality of service value for the data packet includes determining a quality of service value based on the application pursuant to which the subscriber is receiving the data packet.

6. The method of claim 1, wherein determining the type of service parameter includes determining an identity of the wireless client and retrieving the quality of service parameter associated with the wireless client.

7. The method of claim 1, wherein determining a quality of service value for the data packet based upon the type of service parameter and the cell quality further comprises examining a transmission or application control protocol layer of the data packet.

8. The method of claim 1, further comprising:
determining a subscriber quality of service parameter from a subscriber profile associated with the wireless client; and
wherein the quality of service value for the data packet is further based upon the subscriber quality of service parameter.

9. The method of claim 1, further comprising:
transmitting the data packet from a base station system to the wireless client according to the second radio priority.

10. A wireless content switch for transmitting data packets to a wireless client, said wireless content switch comprising:
an upstream port for receiving a data packet for a wireless client;
a bus coupled to the upstream port;
a downstream port coupled to the bus, the downstream port for transmitting the data packet;
memory coupled to the bus, the memory for storing executable code including a quality of service algorithm; and
a processor for executing the executable code, the code, when executed performing the steps of:
receiving the data packet for the wireless client, wherein the data packet has a first radio priority information element;
determining a type of service parameter for the data packet;
determining a cell quality of a cell serving the wireless client;
determining a quality of service value for the data packet based upon the type of service parameter and the cell quality;
replacing the first radio priority information element for the data packet with a second radio priority information element based on the quality of service value; and
transmitting the data packet with the second radio priority information element to the wireless client.

11. The wireless content switch of claim 10, wherein the step of determining a quality of a cell includes determining the quantity of attached subscribers, the quantity of active sessions, the time of day, cell capacity, requested payload size or demand, and the radio link quality.

12. The wireless content switch of claim 10, wherein the first radio priority information element is based on a quality of service parameter.

13. The wireless content switch of claim 10, wherein the memory stores a plurality of records, each of said plurality of records associated with a wireless client, each of said plurality of records comprising:
a wireless client internet protocol (IP) address identifier for identifying an IP address for the wireless client associated with the record; and
a wireless client quality of service identifier for identifying the quality of service for the wireless client associated with the record.

14. The wireless content switch of claim 13, wherein the executable code, when executed, determines the type of service parameter by examining a transmission control protocol layer of the data packet.

15. A method for routing packets to a wireless client from a content server, comprising:
receiving a data packet from the content server;
assigning, by an SGSN, a first radio priority parameter to the data packet, wherein the first radio priority parameter is based on a quality of service parameter in a subscriber profile associated with the wireless client;
determining a type of service parameter from a TCP layer of the data packet;
determining a cell quality for a cell serving the wireless client;
determining a quality of service value based upon the quality of service parameter, the type of service parameter, and the cell quality;
using the quality of service value to determine a second radio priority parameter from a radio priority table;
replacing the first radio priority parameter in the data packet with the second radio priority parameter; and
forwarding the data packet with the second radio priority parameter to a base station system for transmission to the wireless client.

16. The method of claim 15, wherein the cell quality is determined based upon a quantity of attached subscribers, a quantity of active sessions, a cell capacity, and a radio link quality.

* * * * *